United States Patent [19]

Kathawala

[11] 3,890,348
[45] June 17, 1975

[54] INDOLE-1 AND INDOLINE-1-CARBOXAMIDES AND THIOCARBOXAMIDES

[75] Inventor: Faizulla G. Kathawala, West Orange, N.J.

[73] Assignee: Sandoz, Inc., E. Hanover, N.J.

[22] Filed: Mar. 26, 1973

[21] Appl. No.: 344,735

[52] U.S. Cl. ............... 260/326.11 R; 260/326.12 R; 260/326.13 R; 260/326.14 R; 424/274
[51] Int. Cl. .................. C07d 27/38; C07d 27/56
[58] Field of Search ..................... 260/326.11 R

[56] References Cited
OTHER PUBLICATIONS

Dutcher, J. Am. Chem. Soc. 73: 4139–4141 (1951).

Primary Examiner—Joseph A. Narcavage
Attorney, Agent, or Firm—Gerald D. Sharkin; Richard E. Vila; Joseph J. Borovian

[57] ABSTRACT

Disclosed are compounds of the general class of indole-1-carboxamides and thiocarboxamides and compounds which are 2,3-dihydroindole-1-carboxamides and thiocarboxamides. The indole products are prepared by oxidation or dehydrogenation of the corresponding 2,3-dihydro (i.e. indoline) carboxamide or thiocarboxamide and the latter are prepared by reaction of an appropriate indoline compound with isocyanic or thiocyanic acid. The carboxamides and thiocarboxamides have pharmacological activity in animals and are useful an anti-inflammatories.

8 Claims, No Drawings

INDOLE-1 AND INDOLINE-1-CARBOXAMIDES AND THIOCARBOXAMIDES

DISCLOSURE OF INVENTION

The present invention relates to indole-1- and indoline-1-carboxamides and thiocarboxamides, the preparation of such compounds and to methods and compositions utilizing the pharmacological activities of said compounds.

The compounds of this invention may be represented by the formula

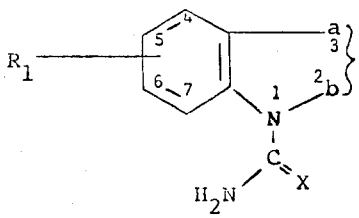

(I)

wherein $\widehat{a\ b}$ is

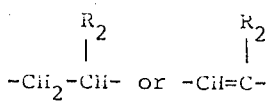

$R_1$ is hydrogen, mono- or dialkylamino in which the alkyl group contains 1 to 3 carbon atoms, halo of atomic weight 18 to 80, amino, nitro, alkyl of 1 to 3 carbon atoms, alkoxy of 1 to 3 carbon atoms or trifluoromethyl and is preferably in the 5 position, $R_2$ is hydrogen or alkyl of 1 to 5 carbon atoms, and X is oxygen or sulfur. The compounds of formula I in which $\widehat{a\ b}$ is

i.e. the compounds of formula

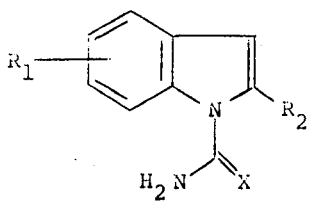 (Ia)

wherein $R_1$, $R_2$, and X are as defined above, can be prepared by oxidizing or dehydrogenating a compound of formula I in which $\widehat{a\ b}$ is

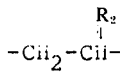

i.e. a compound of the formula

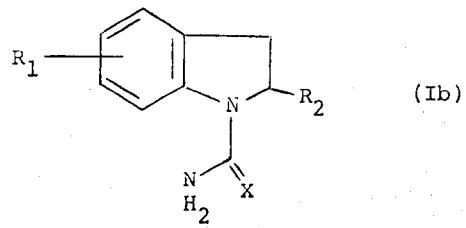 (Ib)

wherein $R_1$, $R_2$ and X are as defined above.

Compounds of formula Ia in which $R_1$ and $R_2$ are both hydrogen and X is oxygen are known (J. Am. Chem. Soc. 73, 4139–41 [1951]).

The preparation of compounds Ia from compounds Ib by oxidation may be conveniently carried out in an inert organic solvent, such as benzene or dioxane, at temperatures in the range of 0°C. to 120°C. typically 15°C. to 100°C. The oxidizing agents which may be employed are of known type, Representative of suitable oxidizing agents are the alkali metal permanganates, such as sodium or potassium permanganate, manganese dioxide, mercuric acetate and dichlorodicyanobenzoquinone, the latter being preferred for oxidizing the thio compounds. Dehydrogenation may also be employed using, for example, palladium on carbon in tetralin.

The compounds of formula Ib may be prepared by subjecting a compound of formula II

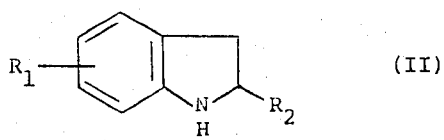 (II)

in which $R_1$ and $R_2$ are as defined, to reaction with isocyanic acid or thiocyanic acid which is provided in a conventional manner by forming in situ from an alkali metal isocyanate or thiocyanate and a suitable acid which in the case of the isocyanic acid is preferably a lower aliphatic carboxylic acid, such as acetic acid; and, for the thiocyanic acid, is preferably aqueous hydrochloric acid. The reaction may be suitably carried out at temperatures in the range of 10°C. to 100°C. and in a solvent medium, such as an excess of acid.

The reaction product of formula II may be isolated by working up by conventional procedures.

The compounds of formula II are known or can be produced according to known procedures, e.g. J. Org. Chem 20 1538 (1955), Bull Soc. Chem France 4 1335–42 (1966) and Chem. Ber. 93 1496–1506 (1960).

The compounds of formula I are useful because they exhibit pharmacological activity in animals such as mammals, particularly anti-inflammatory activity, as indicated by the Carrageenan-Induced Edema test (Winter, *Proc. Soc. Exp. Biol.* 111:544[1962]) in which rats are dosed orally with 10 to 150 mg. of a compound of formula I per kg. of body weight one hour before carrageenan and edema is measured 3 hours after carrageenan. For such use, the compounds may be combined with a pharmaceutically acceptable carrier and such other conventional adjuvants as may be necessary and administered orally in such forms as tablets, capsules, elixirs, suspensions and the like or parenterally in the form of an injectable solution or suspension.

The dosage of active ingredient employed may vary depending on the particular compound employed, the method of administration and the severity of the condition being treated. However, in general, satisfactory results are obtained when the compounds (I) are administered orally at a daily dosage of from about 4 milligram to about 200 milligrams per kilogram of animal body weight, given as a single dose or in divided doses, two to four times a day, or in sustained release forms. For most large mammals, the total daily dosage is from about 250 to about 2000 milligrams. Dosage forms suitable for internal use comprise from about 60 to about 1000 milligrams of the active compound in intimate admixture with a solid or liquid pharmaceutically acceptable carrier or diluent.

The compounds of formula I may be administered orally in such forms as tablets, dispersible powders, granules, capsules, syrups and elixirs, and parenterally as solutions, suspensions, dispersions, emulsions, and the like, e.g., a sterile injectable aqueous suspension. The compositions for oral use may contain one or more conventional adjuvants, such as sweeteners, flavorants, colorants and preservatives. Tablets may contain the active ingredient in admixture with conventional pharmaceutically acceptable excipients, e.g., inert diluents, such as calcium phosphate, terra alba, lactose and talc, granulating and disintegrating agents, e.g., starch and alginic acid, binding agents, e.g., starch, gelatin, polyvinyl pyrrolidone and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups, and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium phosphate and kaolin. The sterile injectable compositions are formulated as known in the art and may contain appropriate dispersing or wetting agents and suspending agents identical or similar to those mentioned above. Those pharmaceutical preparations may contain 1% up to about 90% preferably 3 to 50% of the active ingredient in combination with the carrier or adjuvant.

The preferred pharmaceutical compositions from the standpoint of preparation and ease of administration are solid compositions particularly hard-filled capsules and tablets.

Tablets and capsules containing the ingredients indicated below may be prepared by conventional techniques and are useful in treating inflammation at a dose of one tablet or capsule 2 to 4 times a day.

| Ingredients | Weight (mg.) | |
|---|---|---|
| | Tablet | Capsule |
| 5-dimethylaminoindoline-1-thiocarboxamide | 125 | 125 |
| tragacanth | 10 | — |
| lactose | 122.5 | 175 |
| corn starch | 25 | — |
| talcum | 15 | — |
| magnesium stearate | 2.5 | — |
| Total | 300.0 mg. | 300.0 mg. |

The following pharmaceutical composition is formulated with the indicated amount of active agent using conventional techniques. The oral liquid solution represents a formulation useful in the treatment of inflammation:

| | Liquid Weight % |
|---|---|
| 5-dimethylaminoindoline-1-thiocarboxamide | 0.5 to 3.5 |
| sodium benzoate | 0.1 to 0.5 |
| simple syrup | 30 to 70 |
| flavor | as desired |
| color | as desired |
| sorbitol solution 70% USP | 10 to 30 |
| buffer agent to adjust pH for desired stability | as desired |
| water | to desired volume |

The following examples illustrate the preparation of some of the compounds of this invention.

EXAMPLE 1

5-Bromoindoline-1-carboxamide

To a solution of 37.5 g. 5-bromoindoline in 100 ml. glacial acetic acid is added 30.8 g. potassium cyanate. The mixture is stirred for 30 minutes with water bath cooling. The resulting white suspension is diluted with 1 l. water, filtered and washed with ice water. The resulting solid is dissolved in chloroform and dried over anhydrous Na$_2$SO$_4$. This dried solution is evaporated to the cloud point and allowed to crystallize to give the title product, mp. 157°–158°C.

EXAMPLES 2-7

Following the procedure of Example 1, but using the appropriate 5-substituted indoline and crystallizing from the specified solvent, the following compounds are prepared:

2 5-Chloroindoline-1-carboxamide, mp. 148°–152°C. (from CHCl$_3$)

3 5-Methoxyindoline-1-carboxamide, mp. 177°–179°C. (from ChCl$_3$CH$_3$OH)

4 5-Nitroindoline-1-carboxamide, mp. 220°–223°C (from CHCl$_3$)

5 5-Dimethylaminoindoline-1-carboxamide, mp. 173°–175°C. (from CHCl$_3$/Ether)

6 5-Methoxy-2-methylindoline-1-carboxamide, mp. 161°–164°C. (from Ether)

7 Indoline-1-carboxamide, mp. 161°–164°C. (from CHCl$_3$/Ether)

EXAMPLE 8

5-Bromoindole-1-carboxamide

A mixture of 20 g. 5-bromoindoline carboxamide, prepared as in Example 1, 25 g. manganese dioxide and 300 ml xylene is refluxed with stirring for 22 hours. The resulting mixture is filtered. The filtrate is evaporated to dryness and the resulting product is recrystallized from benzene to give the title product, mp. 150°–152°C.

EXAMPLE 9

Following the procedure of Example 8, but using 5-methoxyindoline-1-carboxamide and crystallizing from chloroform/methanol, one obtains 5-methoxyindole-1-carboxamide, mp. 199°–201°C.

EXAMPLE 10

5-Dimethylaminoindoline-1-thiocarboxamide

A mixture of 13.5 g. 5-dimethylaminoindoline, 19.5 g. potassium thiocyanate, 15 ml. 32% hydrochloric acid and 70 ml. water is refluxed for 5 hours. The reaction mixture is poured into ice/NH₄OH and extracted 3 times with chloroform. The combined organic fractions are washed with 2N sodium chloride solution, dried over anhydrous sodium sulfate and concentrated to a yellow amorphous solid. The solid is dissolved in methanol to which silica gel is added. The resulting mixture is stirred for an hour and filtered. Addition of ether to the filtrate and crystallization yields the title product mp. 157°–159°C.

EXAMPLES 11 AND 12

Following the procedure of Example 10, but using the appropriate indoline compound and crystallizing from methanol, the following are prepared:

11  5-Chloroindoline-1-thiocarboxamide  mp. 197°–198°C
12  Indoline-1-thiocarboxamide, mp. 158°–160°C.

What is claimed is:
1. A compound of the formula

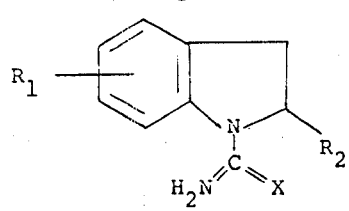

wherein
$R_1$ is hydrogen, mono- or dialkylamino in which the alkyl group contains 1 to 3 carbon atoms, halo of atomic weight 18 to 80, amino, nitro, alkyl or alkoxy of 1 to 3 carbon atoms or trifluoromethyl,
$R_2$ is hydrogen or alkyl of 1 to 5 carbon atoms, and
X is sulfur or oxygen.

2. A compound according to claim 1 wherein X is oxygen.
3. A compound according to claim 1 wherein X is sulfur.
4. A compound of claim 1 wherein $R_1$ is in the 5 position.
5. A compound of claim 1 wherein $R_1$ is dimethylamino.
6. A compound of claim 1 wherein $R_2$ is hydrogen.
7. 5-dimethylaminoindoline-1-thiocarboxamide.
8. The compound of claim 2 which is 5-dimethylaminoindoline-1-carboxamide.

* * * * *